United States Patent
Phadke et al.

(10) Patent No.: US 11,728,740 B2
(45) Date of Patent: Aug. 15, 2023

(54) FLYBACK CONVERTERS WITH IMPROVED MAGNETIC CONFIGURATIONS

(71) Applicant: Apple Inc., Cupertino, CA (US)

(72) Inventors: Vijay G. Phadke, San Jose, CA (US); Prudhvi Mohan Maddineni, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 27 days.

(21) Appl. No.: 17/346,803

(22) Filed: Jun. 14, 2021

(65) Prior Publication Data
US 2022/0399823 A1 Dec. 15, 2022

(51) Int. Cl.
*H02M 3/335* (2006.01)
*H02M 1/34* (2007.01)
*H01F 27/38* (2006.01)
*H02M 1/00* (2006.01)

(52) U.S. Cl.
CPC ........ *H02M 3/33592* (2013.01); *H01F 27/38* (2013.01); *H02M 1/0064* (2021.05); *H02M 1/348* (2021.05); *H02M 3/33507* (2013.01); *H02M 3/33569* (2013.01)

(58) Field of Classification Search
CPC ........ H02M 1/0064; H02M 1/34–348; H02M 3/335; H02M 3/33507; H02M 3/33561; H02M 3/33569; H01F 27/38
See application file for complete search history.

(56) References Cited

U.S. PATENT DOCUMENTS

| | | | | |
|---|---|---|---|---|
| 5,331,533 A | * | 7/1994 | Smith | H02M 3/33576 363/20 |
| 5,694,302 A | * | 12/1997 | Faulk | H02M 3/335 363/16 |
| 6,760,236 B2 | * | 7/2004 | Hsieh | H02M 3/33569 363/21.08 |
| 8,213,190 B2 | | 7/2012 | Li | |
| 9,413,257 B2 | | 8/2016 | Wang | |
| 9,559,601 B2 | | 1/2017 | Persson | |
| 9,837,194 B1 | | 12/2017 | Folker et al. | |
| 9,935,556 B1 | | 4/2018 | Rana et al. | |
| 10,971,290 B2 | | 4/2021 | Lu et al. | |
| 2004/0070997 A1 | * | 4/2004 | Hung | H02M 3/33561 363/21.06 |
| 2008/0297126 A1 | | 12/2008 | Nagano et al. | |
| 2009/0289751 A1 | | 11/2009 | Nagano et al. | |

(Continued)

OTHER PUBLICATIONS

Invitation to Pay Additional Fees w/partial Search for PCT Application No. PCT/US2022/031583 dated Sep. 8, 2022; pp. 19.

(Continued)

*Primary Examiner* — Gary A Nash
(74) *Attorney, Agent, or Firm* — Fletcher Yoder PC

(57) ABSTRACT

Disclosed herein is an improved flyback converter that separates the magnetic components of the converter into a transformer and a separate, discrete energy storage inductor. This arrangement can improve the operating efficiency of the converter by reducing the commutation losses as compared to a conventional flyback converter. The magnetic components may be constructed on separate magnetic cores or may be constructed on magnetic cores having at least one common element, thereby allowing for at least partial magnetic flux cancellation in a portion of the core, reducing core losses.

29 Claims, 8 Drawing Sheets

(56) References Cited

U.S. PATENT DOCUMENTS

| | | | |
|---|---|---|---|
| 2012/0062349 A1 | 3/2012 | Nagano et al. | |
| 2014/0098572 A1* | 4/2014 | Scarlatescu | H02M 3/33546 363/16 |
| 2014/0226367 A1* | 8/2014 | Hu | H02M 3/3353 363/21.04 |
| 2015/0171759 A1* | 6/2015 | Scarlatescu | H02M 3/33523 363/21.09 |
| 2015/0333641 A1* | 11/2015 | Gong | H02M 3/33592 363/21.14 |
| 2017/0048937 A1* | 2/2017 | Wang | H02J 50/10 |
| 2018/0123480 A1 | 5/2018 | Wang et al. | |

OTHER PUBLICATIONS

Office Action for U.S. Appl. No. 17/346,957 dated Jan. 5, 2023; 28 pgs.

* cited by examiner

FLYBACK CONVERTERS WITH IMPROVED MAGNETIC CONFIGURATIONS

BACKGROUND

Because of their simplicity and low cost, flyback converters are commonly used in power converter applications having lower power requirements (e.g., below ~150 W). Various advances in flyback converter development have improved the efficiency over last two decades, such as active clamp flyback converters, valley switching flyback converters, synchronous rectification, etc. Despite these advances the flyback transformer remains a significant source of losses and thus limits the efficiency that a flyback converter can achieve.

Although called a flyback transformer, the arrangement may also be considered as a coupled inductor. Classical transformers used in various power conversion topologies such as forward converters, half bridge and full bridge converters, or LLC resonant converters are able to achieve efficiency levels exceeding 99%. Even in simple, low-cost designs using such topologies, transformer efficiency in excess of 98% are readily achievable. The load current wave shape in these topologies is typically trapezoidal, sinusoidal, or triangular. One aspect that contributes to the high efficiencies possible is that the load current flows in primary and secondary windings simultaneously. Conversely, many if not most flyback converter designs employ a transformer that operates at about 96% efficiency, and it is challenging to design a flyback transformer that operates at 97% efficiency while still maintaining a reasonable power density (and thus physical size).

SUMMARY

Thus, what is needed in the art are improved flyback converter designs that improve the magnetic component design to allow for increased operating efficiency.

A flyback converter can include input terminals configured to receive an input voltage, a transformer having a primary winding selectively energized by the input voltage and a secondary winding configured to deliver an output voltage via a rectifier, a discrete energy storage inductor separate from the primary and secondary windings and coupled in parallel with one of the primary winding or the secondary winding, and a main switching device that switches to selectively energize the primary winding and alternately store energy in the energy storage inductor and allow energy stored in the energy storage inductor to be delivered to the transformer. The discrete energy storage inductor can be coupled in parallel with the primary or the secondary winding. Turning on the main switching device can cause a current through the discrete energy storage inductor in a first direction and a current through the primary winding in a corresponding direction; and turning off the main switching devices can cause the current to continue flowing through the discrete energy storage inductor in the first direction while reversing the current through the primary winding. The rectifier can be a diode.

The transformer can be constructed on a first magnetic core and the discrete energy storage inductor can be constructed on a second magnetic core. The first and second magnetic cores can have at least one common element. Magnetic flux from the discrete energy storage and magnetic flux from the transformer can at least partially cancel in the at least one common element. The converter can further include circuitry coupled between the transformer and the discrete energy storage inductor that offsets the effects of unequal parasitic impedances as between the discrete energy storage inductor and the transformer. The discrete energy storage inductor can be coupled in parallel with the primary winding and the circuitry can include first and second diodes coupled in series with each other and the primary winding and oriented to permit current flow through the primary winding in a first direction, and a third diode coupled in anti-parallel with the series combination of the first and second diodes so as to permit current flow through the primary winding in a second direction opposite the first direction. The discrete energy storage inductor can be coupled in parallel with the primary winding and the circuitry can include a first diode coupled in series with the primary winding and oriented to permit current flow through the primary winding in a first direction and a switching device coupled across the first diodes and operated to permit current flow through the primary winding in a second direction opposite the first direction with minimal voltage drop.

A flyback converter can include a primary winding selectively energized by an input voltage, a secondary winding magnetically coupled to the primary winding that delivers an output voltage via a rectifier, a discrete energy storage inductor separate from the primary and secondary windings and coupled in parallel with one of the primary or secondary windings, and a main switching device. The main switching device can switch on to cause a current through the discrete energy storage inductor in a first direction and a current through the primary winding in a corresponding direction, thereby selectively energizing the primary winding and storing energy in the energy storage inductor. The main switching device can switch off to cause the current to continue flowing through the discrete energy storage inductor in the first direction while reversing the current through the primary winding, thereby allowing energy stored in the energy storage inductor to be delivered to the primary winding. The primary and secondary windings can be constructed on a first magnetic core, and the discrete energy storage inductor can be constructed on a second magnetic core.

The discrete energy storage inductor can be coupled in parallel with the primary or the secondary winding. The first and second magnetic cores can have at least one common element. Magnetic flux from the discrete energy storage and magnetic flux from the primary and secondary windings can at least partially cancel in the at least one common element. The converter can further include circuitry coupled between the transformer and the discrete energy storage inductor that offsets the effects of unequal parasitic impedances as between the discrete energy storage inductor and the transformer. The discrete energy storage inductor can be coupled in parallel with the primary winding and the circuitry can include first and second diodes coupled in series with each other and the primary winding and oriented to permit current flow through the primary winding in a first direction, and a third diode coupled in anti-parallel with the series combination of the first and second diodes so as to permit current flow through the primary winding in a second direction opposite the first direction. The discrete energy storage inductor can be coupled in parallel with the primary winding and the circuitry can include a first diode coupled in series with the primary winding and oriented to permit current flow through the primary winding in a first direction and a switching device coupled across the first diodes and operated to permit current flow through the primary winding in a second direction opposite the first direction with minimal voltage drop.

A power converter can include a primary winding selectively energized by an input voltage, a secondary winding magnetically coupled to the primary winding that delivers an output voltage, and a discrete energy storage inductor separate from the primary or secondary winding and coupled in parallel with one of the primary winding or the secondary winding. The primary and secondary windings can be constructed on a first magnetic core, and the discrete energy storage inductor can be constructed on a second magnetic core. The first and second magnetic cores can have at least one common element. Magnetic flux from the discrete energy storage and magnetic flux from the primary and secondary windings can at least partially cancel in the at least one common element.

In at least one embodiment, the primary and secondary windings can be constructed on a first E-core; the discrete energy storage inductor can be constructed on a second E-core; and the at least one common element can be an I-plate providing a flux path through both the first and second E-cores. At least one leg of the second E-core can have an air gap with respect to the I-plate. At least one leg of the first E-core can have an air gap with respect to the I-plate, and the air gap of the first E-core can be smaller than the air gap of the second E-core. In at least one other embodiment, the primary and secondary windings can be constructed on first and second E-cores; the discrete energy storage inductor is constructed on a third E-core; and the at least one common element is a portion of the second E-core. At least one leg of the third E-core can have an air gap with respect to the second E-core. The third E-core can be smaller than the first and second E-cores.

A flyback converter can include a primary winding selectively energized by an input voltage, a secondary winding magnetically coupled to the primary winding that delivers an output voltage via a rectifier, a discrete energy storage inductor separate from the primary and secondary windings and coupled in parallel with the primary winding, and a main switching device. The main switching device can switch on to cause a current through the discrete energy storage inductor in a first direction and a current through the primary winding in a corresponding direction, thereby selectively energizing the primary winding and storing energy in the energy storage inductor. The main switching device can switch off to cause the current to continue flowing through the discrete energy storage inductor in the first direction while reversing the current through the primary winding, thereby allowing energy stored in the energy storage inductor to be delivered to the primary winding. The primary and secondary windings can be constructed on a first magnetic core, and the discrete energy storage inductor can be constructed on a second magnetic core. The first and second magnetic cores can have at least one common element. Magnetic flux from the discrete energy storage and magnetic flux from the primary and secondary windings can at least partially cancel in the at least one common element.

In at least one embodiment, the primary and secondary windings can be constructed on a first E-core; the discrete energy storage inductor can be constructed on a second E-core; and the at least one common element can be an I-plate providing a flux path through both the first and second E-cores. At least one leg of the second E-core can have an air gap with respect to the I-plate. At least one leg of the first E-core can have an air gap with respect to the I-plate, and the air gap of the first E-core can be smaller than the air gap of the second E-core. In at least one other embodiment, the primary and secondary windings can be constructed on first and second E-cores; the discrete energy storage inductor is constructed on a third E-core; and the at least one common element is a portion of the second E-core. At least one leg of the third E-core can have an air gap with respect to the second E-core. The third E-core can be smaller than the first and second E-cores.

An electromagnetic structure for use in a power converter can include a first magnetic core having disposed thereon a transformer having a primary winding and a secondary winding magnetically coupled to the secondary winding and a second magnetic core having disposed thereon a single inductor winding. The first magnetic core and the second magnetic cores share at least one common element. Depending on an electrical connection of windings of the transformer and the inductor, magnetic flux associated with the transformer can at least partially cancel magnetic flux associated with the inductor in the at least one common element.

In at least one embodiment, the primary and secondary windings can be constructed on a first E-core; the discrete energy storage inductor can be constructed on a second E-core; and the at least one common element can be an I-plate providing a flux path through both the first and second E-cores. At least one leg of the second E-core can have an air gap with respect to the I-plate. At least one leg of the first E-core can have an air gap with respect to the I-plate, and the air gap of the first E-core can be smaller than the air gap of the second E-core. In at least one other embodiment, the primary and secondary windings can be constructed on first and second E-cores; the discrete energy storage inductor is constructed on a third E-core; and the at least one common element is a portion of the second E-core. At least one leg of the third E-core can have an air gap with respect to the second E-core. The third E-core can be smaller than the first and second E-cores.

DETAILED DESCRIPTION

Figure 1:
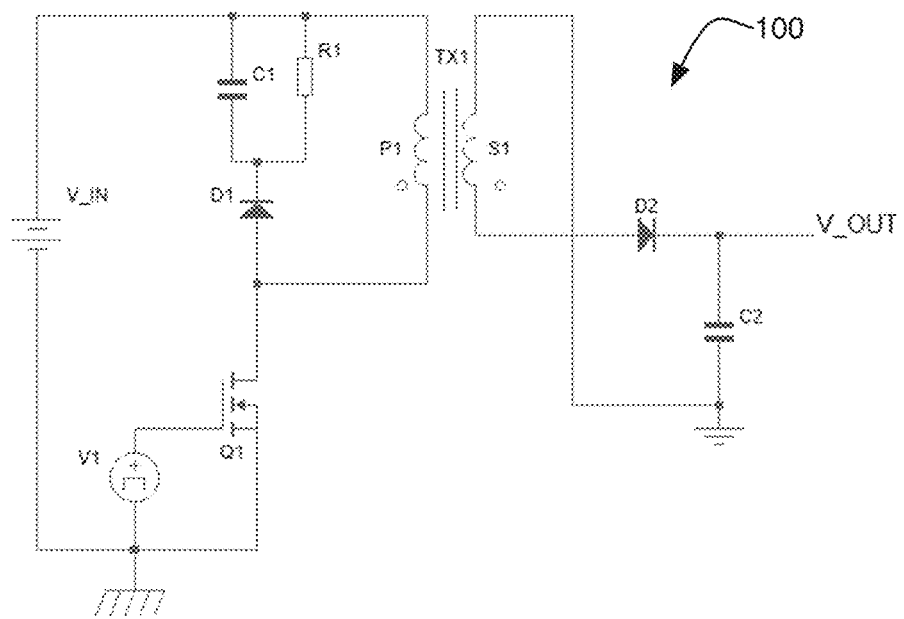
FIG. 1 illustrates a schematic diagram of an exemplary flyback converter.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 2A:
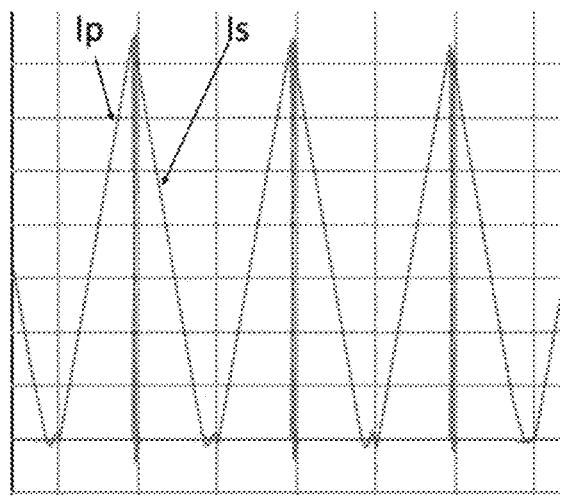
FIGS. 2A and 2B illustrate current waveforms for the primary and secondary windings of the flyback transformer/coupled inductors of the flyback converter in FIG. 1.
Figure 2B:
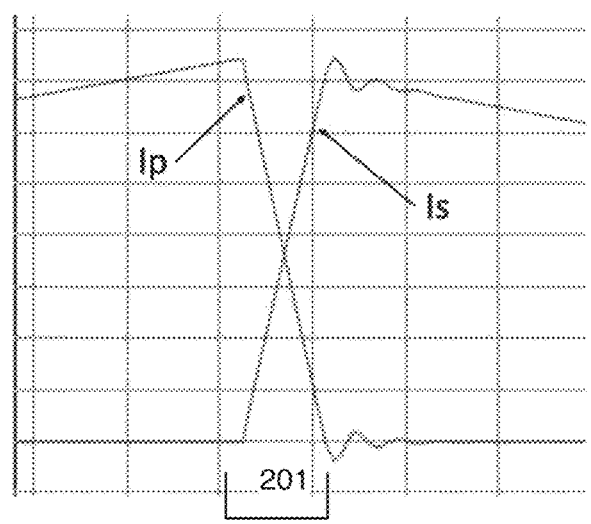

FIG. 1 illustrates a schematic diagram of an exemplary flyback converter 100. FIGS. 2A and 2B illustrate exemplary current waveforms for the primary and secondary windings of the flyback transformer/coupled inductors. As shown in FIG. 1, one end of the primary winding P1 is connected to the positive node of the input DC source V_IN, and the other end of primary winding P1 is connected to the negative node of the input DC source V_IN through a semiconductor switch Q1, which is the main switch of the flyback converter.

Also on the primary side is a snubber/clamp circuit, made up of diode D1, capacitor C1, and resistor R1. Operation of this simple passive snubber circuit will be understood by those skilled in the art, and its operation is not pertinent to the present disclosure. Thus, details of its operation will not be repeated here. Additionally, this clamp could be replaced with other clamp designs, including various active clamp designs (incorporating active switching devices), which are also compatible with the teachings of the present disclosure. The secondary winding S1 of the flyback transformer may connected to the output filter capacitor C2 and the load (V_OUT) through a rectifier diode D2. Although the output rectifier is, in this example, a simple diode, a synchronous rectifier or other rectification circuit could alternatively be used as appropriate for a given application. The dot polarity of the windings indicates that the primary and secondary windings operate out of the phase with respect to each other.

In any real-world implementation of a flyback converter, the coupling between the primary winding P1 and secondary winding S1 is not perfect, and a leakage inductance is present. This leakage inductance represents the energy that cannot be transferred to the output. As known to those skilled in the art, flyback converters can operate in a Continuous Conduction Mode (CCM) or a Discontinuous Conduction Mode (DCM). The present disclosure is applicable to both operating modes. However, because a detailed analysis of flyback converter operation is not pertinent to the present disclosure, DCM mode is used for purposes of discussion.

Because the flyback transformer/inductor arrangement needs to store energy, an air gap may be introduced in the magnetic path of the transformer core. When main switch Q1 turns on, primary current Ip (FIGS. 2A/2B) ramps up linearly in the primary winding/inductor P1, while generating flux in the core and storing energy in the air gap region. Main switch Q1 subsequently turns off based on the timing or threshold set by the control circuit (not shown in FIG. 1). At this instant, when the primary current Ip in primary winding/inductor P1 is interrupted, the voltage at the top end of main switch Q1 rises. Because the current in an inductor cannot be interrupted, the current Is (FIGS. 2A/2B) finds a way to flow in the secondary winding S1, through the rectifier D2, into the output filter capacitor C2 and the load V_OUt. The rising voltage across primary winding P1 causes a voltage to develop across the leakage inductance of the flyback transformer/coupled inductor arrangement, which determines the rate of transfer of current from the primary winding P1 to the secondary winding S1. This time period, when the current in the primary winding P1 falls from its peak value to zero, and the current in the secondary winding rises from zero to its peak value may be called the "Transition Period" or "Current Commutation Period" (FIG. 2B: 201)

Figure 3:
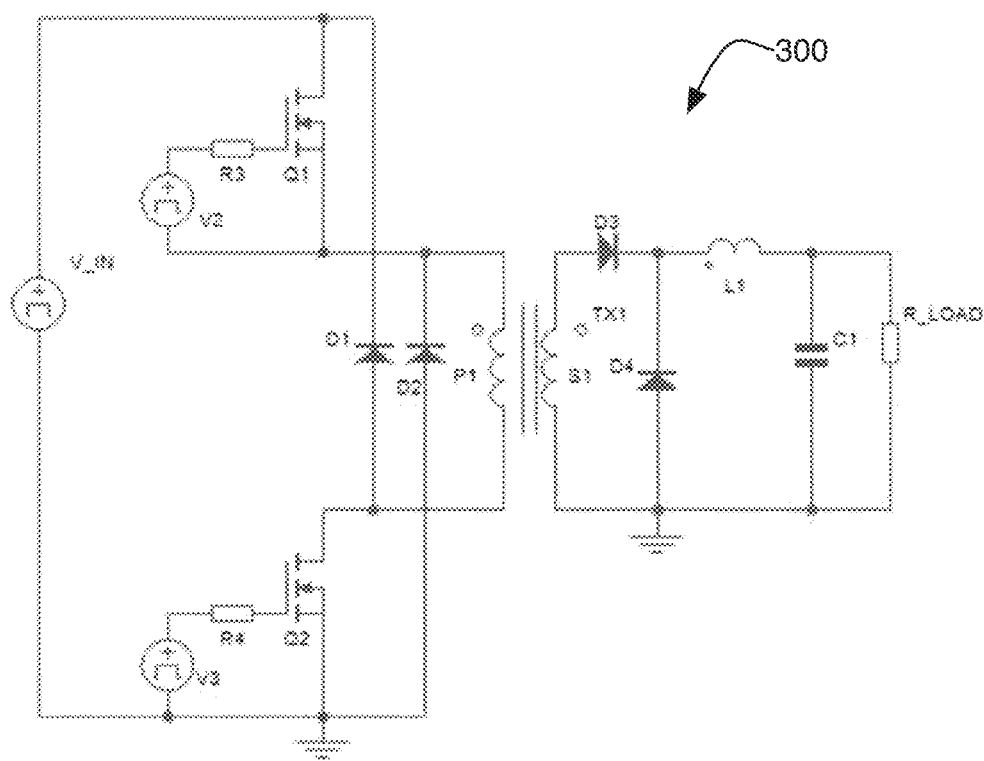
FIG. 3 illustrates an exemplary forward converter.
Figure 4:
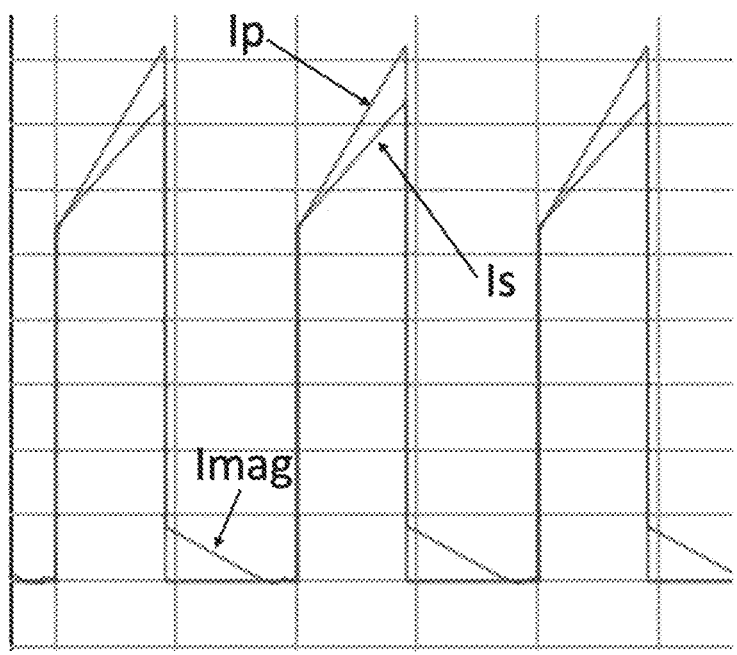
FIG. 4 illustrates current waveforms associated with forward converter operation.

In contrast to a forward converter, the transformer in a flyback converter operates in a manner that may be better described as a coupled inductor, rather than a transformer in the strictest sense of the word. In other words, the flyback converter may be considered to be a coupled inductor with "energy storage and delivery" as its main function. This creates some unique scenarios that are not present with conventional transformer operation in a forward converter. FIG. 3 illustrates an exemplary forward converter, and FIG. 4 illustrates current waveforms associated with forward converter operation. Detailed behavior of the forward converter topology is unnecessary to the present disclosure, but one relevant aspect of forward converter operation is the current phase relationship of primary and secondary windings. More specifically, the primary current Ip and secondary current Is flow alternately in flyback converter (FIGS. 2A, 2B), while they flow at the same time in forward converter. More specifically, as seen in FIG. 4, when primary switches Q1 and Q2 are turned on, primary current Ip ramps up in the primary winding P1 and secondary current Is ramps up in secondary winding S1 at the same time and at the same rate.

High frequency switching transformers, such as those used in both forward and flyback converters, experience conduction losses in the windings in addition to the core losses. These conduction losses are represented as $I^2R$ losses; however, there are additional losses caused by complex mechanisms that are difficult to represent. In general, conduction losses can be represented as: $Irms^2 \times R = (Idc^2 \times Rdc) + (Iac^2 \times Rac)$, where Irms is the root-mean-square current, R is the aggregate resistance, IDC is the DC component of the current, Rdc is the DC resistance, Iac is the AC component of the current, and Rac is the AC resistance. The DC component of the current, or the average current, flows uniformly in the primary and secondary windings and causes DC conduction losses. The DC resistance of the winding(s) is responsible for this DC loss. The AC component of the current may not flow uniformly in a conductor under the influence of the magnetic field caused by the alternating current flowing in itself, as well as the AC current flowing in adjacent conductors or windings. The DC current tends to take the path of least resistance, while the AC current tends to take the path of least inductance. As a result, the AC current can get constricted in the outer portions of the conductor due to skin effect. The AC losses can be reduced by using conductors having a thickness less than or equal to the skin depth at the operating frequency. Additionally, sandwiching and keeping the number of winding layers low can reduce AC losses in forward converter transformer, such as the arrangement illustrated in FIG. 3.

Turning now to FIG. 4, it can be seen that the primary current Ip and the secondary current Is rise at the same time and same rate. The example waveforms use a transformer with a 1:1 turn ratio for easier understanding, but the same principles are applicable to transformers with other turns ratios. The higher peak level of primary current Ip is due to magnetizing current Imag, which flows only in the primary winding P1. Also, it will be noticed that the phase relationship of primary and secondary current is opposite; i.e., current enters the primary winding from the dotted end, and current exits secondary winding from the dotted end. As a result, the flux created by the load current reflected to the primary side is cancelled by the load current flowing in the secondary, barring a small leakage field between the two windings because of imperfect coupling. Thus, the flux in the core is generated exclusively by the magnetizing current, and the load current has practically zero effect on the magnetic flux in the core.

Because of this operation, the triangular magnetizing current Imag flowing in the primary winding P1 causes a varying magnetic field between the primary and secondary. This field causes eddy currents in the secondary winding S1. Because magnetizing current Imag is small as compared to the load current, the effective proximity losses are very low. Load current Is also generates a varying magnetic field between the two windings, but this varying magnetic field is limited to a leakage field, and is not significant in most cases. If the primary and secondary windings are interleaved, the leakage inductance may be reduced, and these losses can be further reduced.

Similar phenomena to those discussed above may be seen in all forward converter topologies, i.e., topologies in which load current flows simultaneously in the primary and secondary windings. This includes, for example, various half bridge and full bridge converters, LLC converters, etc. Conversely, flyback converters, such as that shown in FIG. 1 can have complex transformer power loss mechanisms because of the differing phase relationship of the primary and secondary currents.

Turning back to FIG. 2A, when switch Q1 turns on, primary current Ip starts to ramp in the primary winding P1at a fixed up-slope. This varying current produces flux in the core and energy is stored in the gap field. This flux in the gap field creates a fringing field. Under the influence of this magnetic field, as well as the magnetic field created by fast rising current in the primary, the secondary winding S1 experiences induced eddy currents. These eddy currents depend upon the rate of change of flux density. If the winding is placed close to the air gap, this field is much stronger and causes higher eddy currents. These circulating currents cause power loss in secondary winding S1, which are "non-conducting losses." Any conductor placed in the magnetic field of the primary winding P1 and/or air gap will experience such losses, including, for example, EMI Faraday shields that may be interposed between the primary and secondary windings, other tertiary windings, etc.

When switch Q1 turns off, current transfers from primary winding P1 to secondary winding S1, and energy stored in the air gap field is delivered to the output. During this discharge time, the secondary current Is ramps down steadily. During this current down slope, the primary winding is the non-conducting winding that experiences circulating currents analogous to those described in the preceding paragraph. To summarize, each primary and secondary winding of a flyback transformer/coupled inductor arrangement experiences non-conducting losses caused by the varying magnetic field of the adjacent conducting winding and the air gap field.

Further, the current waveforms in FIG. 2B show the transition or commutation period 201 when the current transfers from primary winding P1 to secondary winding S1. As can be seen, the slope of the current is relatively high, and the phase relationship is such that the magnetic field created by currents in the primary and secondary windings is not cancelled as in the forward converter example discussed with respect to FIG. 4. These fast falling and rising currents create a fast changing magnetic field between the primary and secondary windings, even if the magnetic field in the air gap (i.e., stored energy) is substantially constant. This rapid change (high frequency) causes the associated current in the windings to be restricted to the outer portions of the conductor. During this transition time, the current amplitude is large, with high harmonic content. Even though this period may be short relative to the overall switching time (e.g., lasting only for few hundred nanoseconds), the power loss in the windings during this transition time can be quite high and can even dominates the total converter losses.

Because of the phase relationship of primary and secondary currents in a flyback converter, it can be difficult to achieve greater than 97% efficiency in flyback transformers, even after adding significant cost and complexity. As one example, high performance flyback transformer designs may use Litz wires comprised of very thin strands, much thinner than the skin depth at the switching frequency. The wire size may be dictated by the harmonic content of the current edges during commutation. As a result, a significant portion—even most—of the power loss in flyback converter can be in the transformer because of the eddy currents caused during the non-conducting and transition periods.

Figure 5:
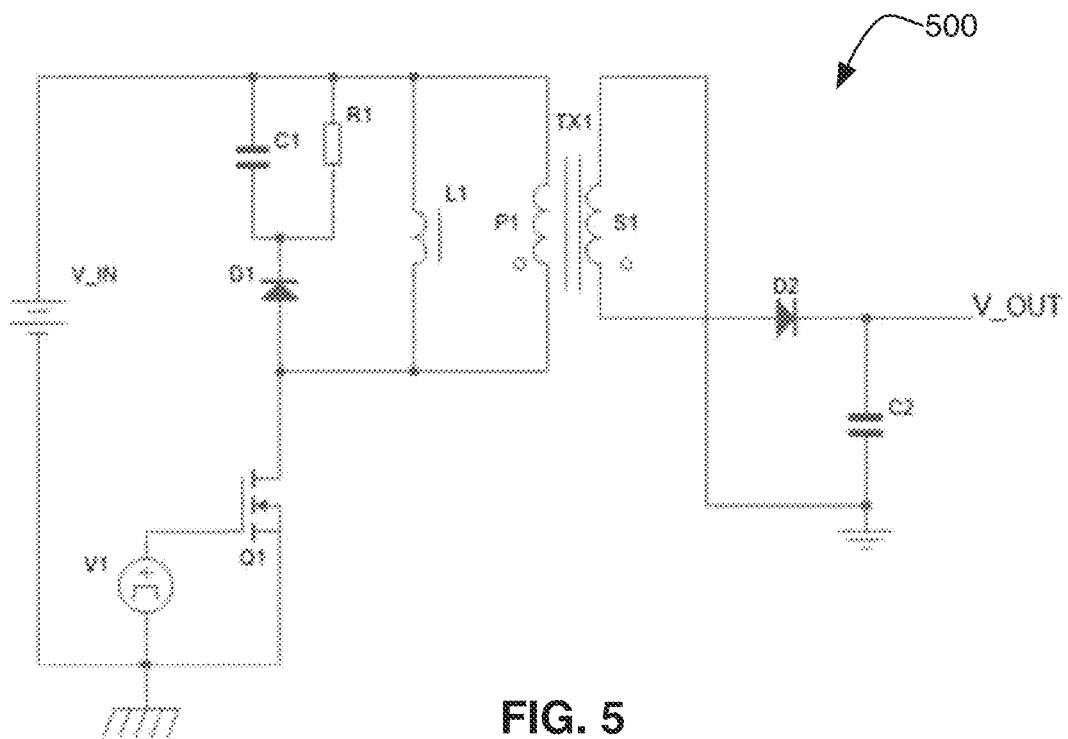
FIG. 5 illustrates a flyback converter with separated magnetic elements.

One way to address this issue is to separate the main magnetic element, i.e., the flyback transformer or coupled inductors, into two separate elements. More specifically, the flyback transformer/coupled inductors may be separated into an energy storage inductor and a forward transformer. Such an arrangement is illustrated in FIG. 5. As shown, a discrete (energy storage) inductor L1 may be connected in parallel with flyback transformer TX1. The polarity of the transformer windings may be arranged such that the magnetic flux generated by the load related current in the primary and secondary windings is cancelled. Because energy storage inductor L1 is a discrete inductor, it does not have any winding phase relationship with respect to the transformer windings. Energy storage inductor L1 may be designed to have an inductance value the same as or substantially the same as a traditional flyback transformer primary winding. In at least some embodiments, a ferrite core for inductor L1 may be used to provide low core losses. Additionally, such a core may incorporate an appropriate air gap to achieve the desired inductance value (and energy storage characteristics).

Furthermore, transformer TX1 can use the same turns ratio that would be used in a traditional flyback transformer, but no special attempt need be made to set its primary inductance (because that inductance is provided by the energy storage inductor L1). Because ferrites can have high magnetic permeability, the resulting primary winding inductance of TX1 may be significantly higher than the inductance of L1. A small air gap can be introduced in the magnetic path of flyback transformer TX1 to improve its DC handling capability, taking care of potential DC bias in the transformer during start up or during dynamic load conditions. This air gap may be relatively, small and the resulting magnetizing inductance can still higher (even significantly higher) than the inductance of energy storage inductor L1. It should also be noted that, although the energy storage inductor L1 may be connected in parallel with the primary winding P1 of transformer TX1, the two may not see an identical volt-second product because the respective coils may carry different amounts of current and may have different resistances. Thus, the (small) air gap in TX1 described above allow some DC bias without any adverse impact on the operation.

As seen in FIG. 5, the connection of the primary winding P1 to input DC source (V_IN), main switch Q1, and the snubber circuit can be substantially as discussed above with respect to FIG. 1. Likewise, on the secondary, the connection polarity of secondary rectifier diode D2 as above. Transformer TX1 can thus be considered as the same as the traditional flyback transformer arrangement discussed above, including connections of its primary and secondary nodes, except, that the transformer does not require a significant air gap. This can result in a high primary inductance.

Figure 6:
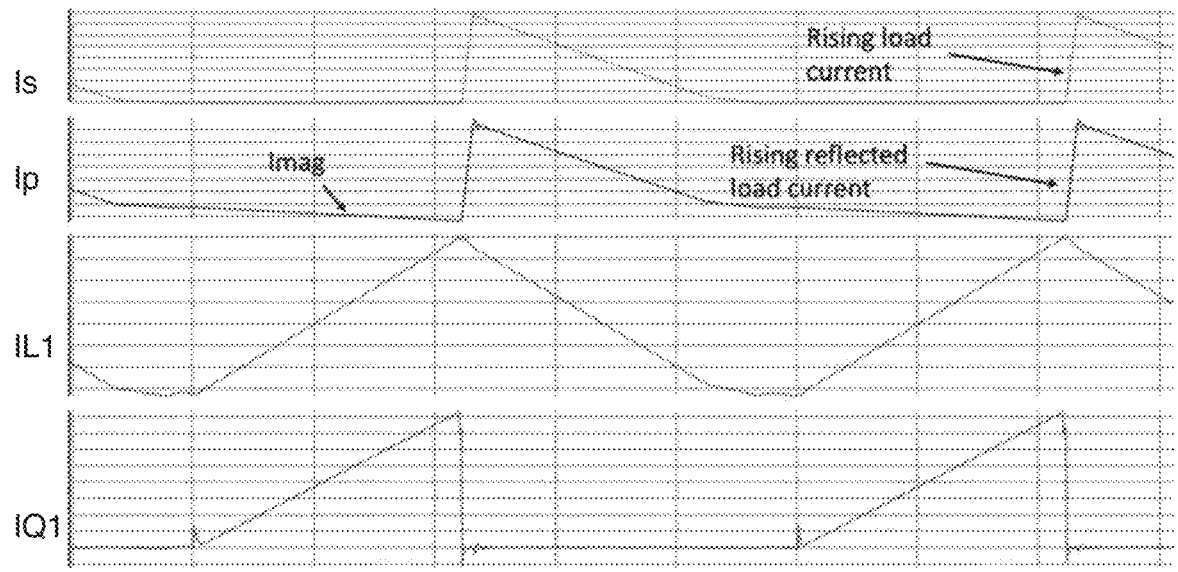
FIG. 6 shows various waveforms illustrating operation of the split-magnetic flyback converters depicted in FIG. 5.

FIG. 6 shows various waveforms illustrating operation of the split-magnetic flyback converters depicted in FIG. 5. The current in the switch Q1 (IQ1) is substantially the same as in the traditional flyback converter of FIG. 1. The energy storage inductor L1 has a triangular current (IL1), because this inductor carries current during the on time of switch Q1 as well as during the flyback time when the secondary rectifier D2 delivers the power to the load. The primary winding P1 has a current Ip that includes a small magnetizing current (Imag) during the on time of main switch Q1. Because of the relatively high inductance of the primary winding, the slope of Imag is relatively low, and the resultant Eddy current losses in the adjacent non-conducting secondary winding S1 are correspondingly low.

When main switch Q1 turns off, the voltage across energy storage inductor L1 reverses, and the current flowing therein is injected into primary winding P1 of transformer TX1. This current is transferred to the secondary side based on the turns ratio of the transformer, as in a forward converter transformer. Because of the phasing of the primary and secondary windings (and the current therein), the flux generated by the relatively fast-rising load current in the primary and secondary windings is cancelled out, barring the small field generated in the leakage inductance. Thus, transformer TX1 may be considered to be effectively operating as a current transformer.

The RMS current in energy storage inductor L1 may be higher than the primary winding current of a traditional flyback converter, because the current flows in energy storage inductor L1 during both its charging and discharging phases. However, energy storage inductor L1 does not experience any eddy current losses, because there is neither any non-conducting winding nor current commutation. Because energy storage inductor L1 does not need any galvanic isolation, it can be of relatively small physical size and can use Litz wire to negate the effects of fringing magnetic flux of the air gap field.

Additionally, transformer TX1 experiences minimal eddy current losses in the non-conducting secondary winding during the on time of main switch Q1. This is because of the relatively slowly rising magnetizing current (Imag). This can, for example, allow the use of copper foil windings or PCB-based planar transformers for low profile designs. Also, because of the negligible eddy current losses as compared to a traditional flyback transformer, the transformer windings can use relatively thicker wires to reduce DC losses.

To summarize the foregoing, a flyback converter can split the magnetic component (i.e., the flyback transformer/coupled inductor arrangement) into a separate, discrete energy storage inductor L1 and what is effectively a current transformer TX1. The separate, discrete energy storage inductor L1 can perform the energy storage and release functions of a conventional flyback transformer, while the transformer TX1 can be designed to function as a current transformer and provide galvanic isolation. This arrangement can allow for substantial loss reductions as compared to a conventional flyback converter without a discrete energy storage inductor.

Figure 7:
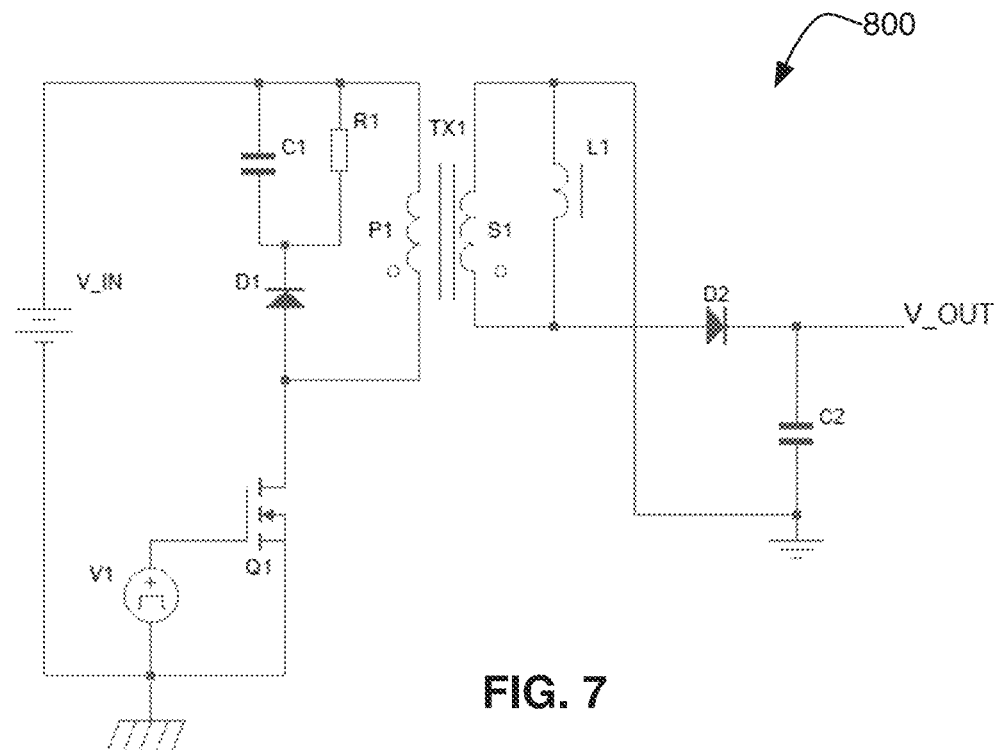
FIG. 7 shows an alternative split-magnetics flyback converter in which an energy storage inductor is connected in parallel with the secondary winding.

FIG. 7 shows an alternative flyback converter 800 in which energy storage inductor L1 is connected in parallel with the secondary winding S1. The current in inductor L1 remains triangular in nature, with no commutation losses. The rising and falling edges of the currents in the primary and secondary windings cancel as in the embodiments discussed above. As a result, this converter configuration also does not experience the relatively higher eddy current losses associated with conventional flyback converter designs. Placement of the energy storage inductor either in parallel with the primary winding or in parallel with the secondary winding may be decided based on the physical limitations of a particular implementation and choice of the designer.

Figure 8:
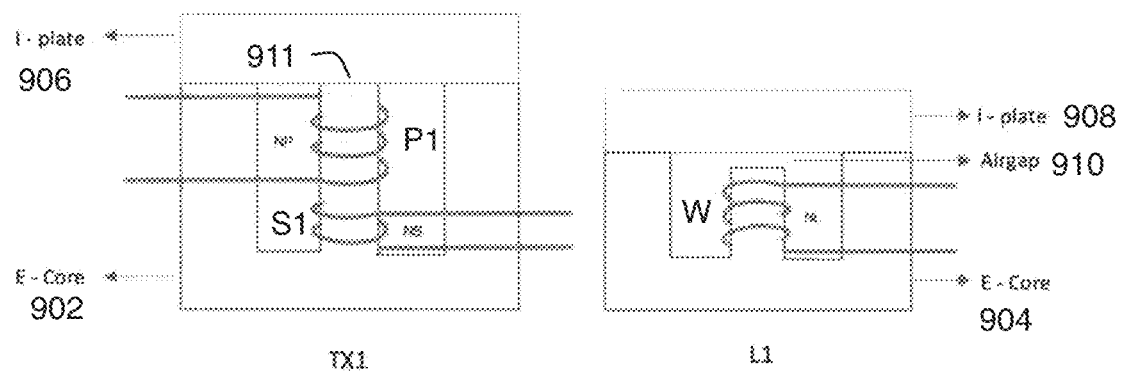
FIG. 8 illustrates one physical construction implementation of separate, discrete energy storage inductor and transformer for a flyback converter.

FIGS. 8-12 illustrate various physical construction implementations of electrically-separated energy storage inductors and transformers for use in a split-magnetic flyback converter as described above with reference to FIGS. 5-7. More specifically, in the flyback converters described above, the energy storage inductor L1 and the transformer TX1 can be separated into discrete circuit elements. FIG. 8 represents a simple way to implement the split magnetic components using substantially similar "EI" ferrite core geometry for energy storage inductor L1 and transformer TX1, using respective E-shaped cores 902, 904 and I-shaped cores 906, 908. Energy storage inductor L1 has only one winding W, while transformer TX1 includes at least a primary winding P1 and a secondary winding S1. In the illustrated example, the number of turns used for the primary winding P1 of TX1 and number of turns of L1 are kept the same, although this need not necessarily be the case. An air gap 910 may be introduced in the magnetic path of the inductor L1 to allow energy storage. This air gap can be only in the center leg or distributed across multiple legs. For the following discussion, a gap in the center leg will be described, although the described concepts similarly apply to both gapping techniques as well as other core configurations.

As shown in FIG. 8, energy storage inductor L1 uses one E-core 904 and one I-core or plate 908. Similarly, transformer TX1 also uses one such set, including E-core 902 and I-core or plate 906. The height of E-core 902 for transformer TX1 can be higher than for inductor E-core 904 because of safety isolation requirements and higher stack thickness because of primary and secondary windings. However, the effective cross section of the cores may be the same. As noted above, small air gap 911 can be introduced in the magnetic path of TX1 to improve its DC handling capability, to take care of possible DC bias in during start up or dynamic load conditions. This air gap can be small, and resulting magnetizing inductance can still be significantly higher than the energy storage inductance L1. (As with the inductor, air gap 911 may be placed on any leg of the core or distributed, although due to the relative size of the air gap, a single leg air gap may be preferable.). As noted above, although energy storage inductor L1 may be directly connected in parallel with the primary winding of TX1 (or the secondary winding), the inductor and transformer windings may not see identical volt-second products. This is because the two windings may carry different amounts of current and may have different resistances. Thus, as noted above, a small air gap in TX1 will allow some DC bias without any adverse impact on the operation.

The two magnetic components illustrated in FIG. 8 can be placed side by side or can also be placed on top of each other for reduced foot print in the system. Alternatively, the two magnetic components can share at least a portion of their respective magnetic cores as described below with respects to FIGS. 9-12.

Figure 9:
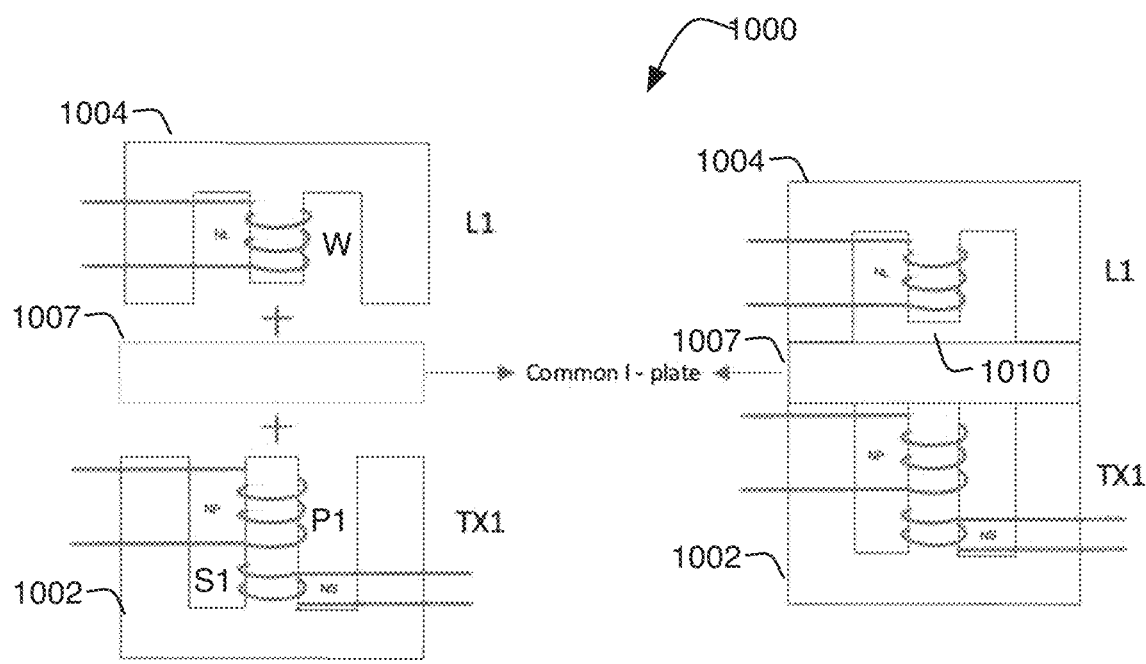
FIG. 9 illustrates a physical construction implementation of a separate, discrete energy storage inductor and transformer for a flyback converter having common magnetic core elements.

FIG. 9 shows one embodiment 1000 of split magnetic components for a flyback converter sharing at least one common magnetic core component. The configuration of FIG. 9 uses a common ferrite core plate 1007 for the energy storage inductor L1 and the transformer TX1. Otherwise, construction of the components is generally as described above with respect to FIG. 8. More specifically, transformer TX1 includes windings P1 and S1 wound on E-core 1002 which may be coupled to common I-core 1007. Similarly, energy storage inductor L1 may include a winding W wound on E-core 1004 and may share common I-core 1007. An airgap 1010 may be included in inductor L1 as described above to provide the desired inductance/energy storage capabilities. Additionally a small air gap (not shown) may be provided for transformer TX1.

Figure 10:
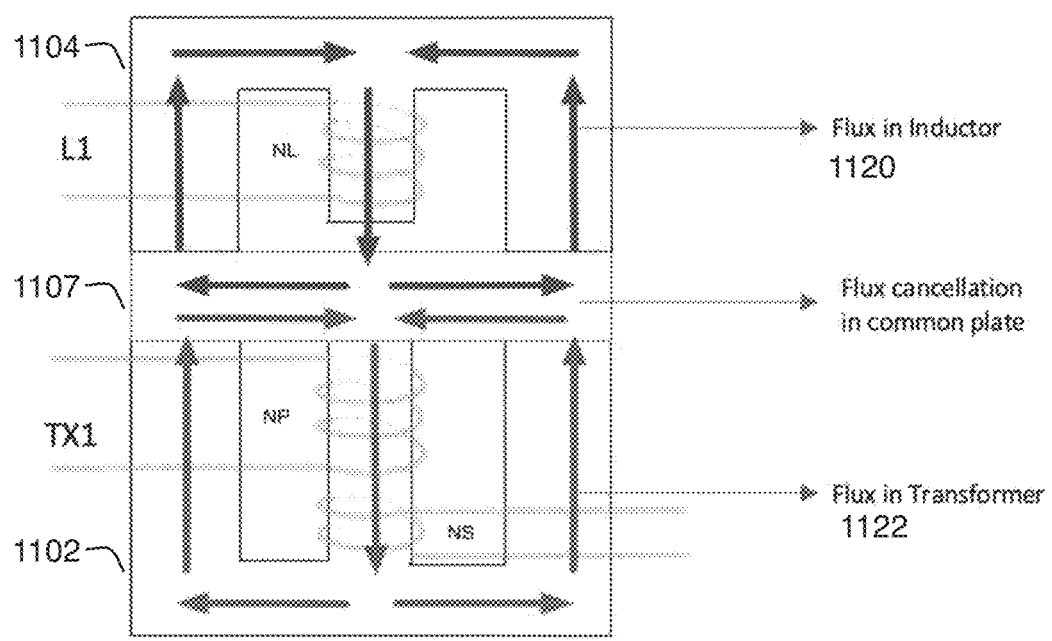
FIG. 10 illustrates a physical construction implementation of a separate, discrete energy storage inductor and transformer for a flyback converter having common magnetic core elements as in FIG. 9 with magnetic flux directions indicated.

With reference to FIGS. 9 and 10, the inductor winding terminals may be connected in parallel with the primary winding terminals (or the secondary winding terminals) of the transformer such that the direction of the flux lines generated in the transformer (1122) are opposite in direction to the flux lines generated in the inductor (1120) in the common ferrite plate 1007, which is illustrated in FIG. 10. More specifically, because the cross section of the center and outer limbs of ferrite cores used for energy storage inductor L1 and transformer TX1 may be substantially the same, and because substantially similar volt-seconds may be applied to the two windings during the on time of main switch Q1, the flux generated in the respective cores 1102 and 1104 may be substantially the same. By virtue of phasing of the parallel winding connection, the flux lines flowing in the common plate 1107 can thus have substantially equal amplitude and opposite direction. Thus, the resultant flux in the common plate 1107 can be practically zero. (In reality, a small amount of flux may still flow in common plate 1107 as the volt-second product impressed on the windings of energy storage inductor L1 and transformer primary TX1 may be not exactly equal because of different resistances between them, for example.) However, for practical purposes, the flux density is relatively low, and, as a result, the common plate 1107 does not experience appreciable core losses.

It will be appreciated that the arrangement of FIG. 8 incurs core losses in two E-cores and two I-cores/plates. However, the embodiment of FIGS. 9 and 10 experiences core losses only in two E-cores because the common I-plate 1107 has practically no net flux and thus practically no core losses. The windings of energy storage inductor L1 and transformer TX1 can remain the same as between the embodiments of FIGS. 8-10, thus reducing power losses, cost, and volume/space consumed.

For design flexibility and optimization, it is possible that energy storage inductor L1 and primary winding P1 of transformer TX1 may use different numbers of turns but cores of identical cross section for a compact integration. The structure may remain identical to the one shown in FIGS. 9 and 10. Because the number of turns as between inductor L1 and primary winding P1 is different, the magnetic flux generated in the inductor core will be different than magnetic flux generated in the transformer core, even though substantially identical volt-seconds are applied to the respective components. As a result, the flux will not completely cancel in the common core plate. This configuration will cause some core losses in the common I-core/plate 1107, but offers flexibility to the system designer to optimize overall performance.

As one example, the construction of energy storage inductor L1 can be very simple (as compared to conventional flyback transformer/coupled inductor arrangements), because the inductor can have only one winding and does not necessarily need the added complexity of safety insulation. Twisted wire strands or Litz wire can be used to construct the windings of energy storage inductor L1. By virtue of this simplicity, the energy storage inductor winding W can have a higher number of turns than the primary winding P1 of transformer TX1. As a result, the flux may not exactly cancel in the common I-plate 1107, which will experience some core losses. However, by virtue of higher number of winding turns, the flux density in the E-core 1104 of inductor L1 will be lower, thereby reducing its net core losses. This can result in an overall net reduction in core losses for energy storage inductor L1, with the tradeoff of a higher winding resistance.

In some embodiments, it may be preferred to use fewer turns in primary winding P1 of transformer TX1 to achieve similar benefits to those described in the preceding paragraph. Thus, embodiments in accordance with the teachings herein need not be limited to having identical numbers of turns as between energy storage inductor L1 and primary winding P1 of transformer TX1. In fact, in some embodiments the respective numbers of turns may be quite different to achieve a desired performance balance. However, the phase relationship of the energy storage inductor and transformer winding connections must be maintained to allow flux cancellation in the common I-plate. If the phase relationship is reversed, it can cause double the flux density in the common core part, thereby causing higher core losses.

Figure 11:
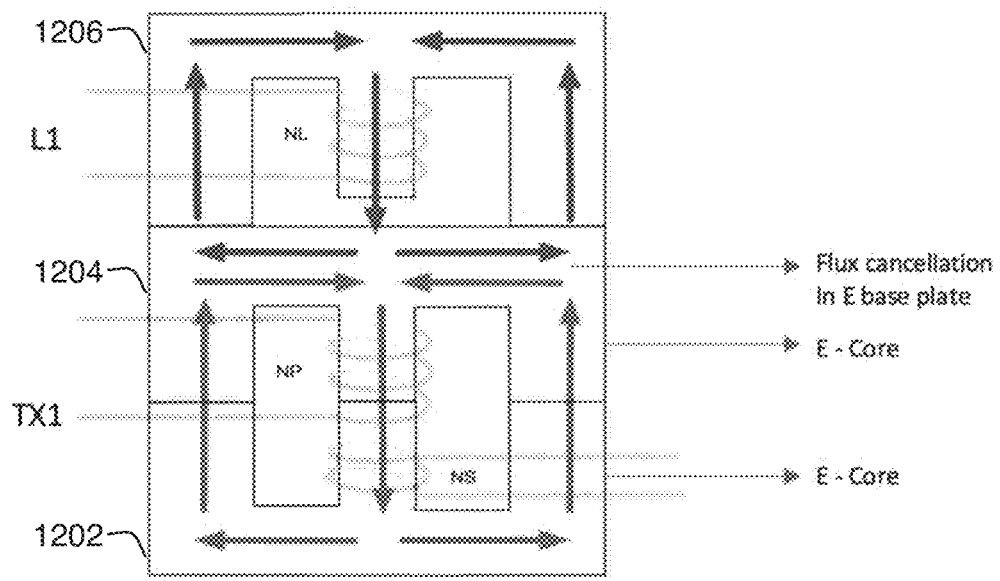
FIG. 11 illustrates another physical construction implementation of a separate, discrete energy storage inductor and transformer for a flyback converter having common magnetic core elements with magnetic flux directions indicated.
Figure 12:
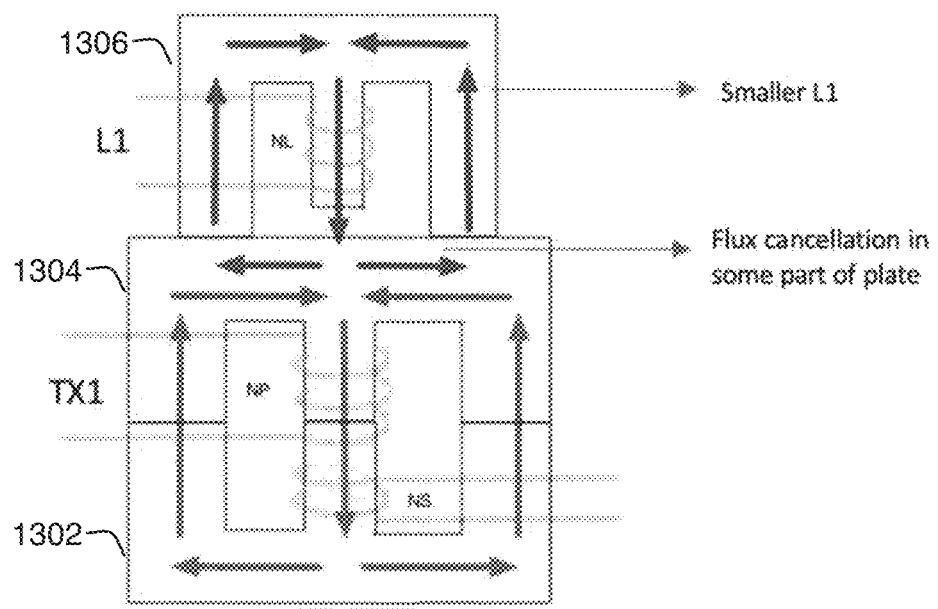
FIG. 12 illustrates another physical construction implementation of a separate, discrete energy storage inductor and transformer for a flyback converter having common magnetic core elements with magnetic flux directions indicated.

Other core configurations incorporating the teachings of the above disclosure are also possible. For example, FIG. 11 discloses the use of two E-cores 1202 and 1204 for the transformer core (sometimes called an "EE-core," a single E-core 1206 for the inductor, with the common core portion being the vertical portion of the "E" of E-core 1204. As shown in FIG. 11, the magnetic flux cancels in the common limb of the EE-core of the transformer. Additionally or alternatively, core sets of different cross sections and different dimensions can also be used depending upon space limitations and design needs. Another possibility is shown in FIG. 12, in which transformer TX1 is constructed using an EE-core having a first E-core 1302 and a second E-core 1304. Energy storage inductor L1 is constructed using a smaller E-core 1306. In other respects, the construction is generally as described above with respect to FIGS. 9-11. In the embodiment of FIG. 12, a common portion of E-core 1304 between is used together with appropriate phase connection as described above. As in the preceding embodiments, the net magnetic flux density in the common core portion is reduced, which can allow this core portion to be built thinner without any adverse performance impact. This can further reduce both the cost and space consumed by the embodiment.

In each of the above-described embodiments, the common magnetic path effectively acts as a "magnetic mirror" when magnetic flux cancels in it. This can allow for the energy storage inductor L1 to exhibit all desired energy storage properties while simultaneously and independently allowing for optimization of the transformer performance.

Figure 13:
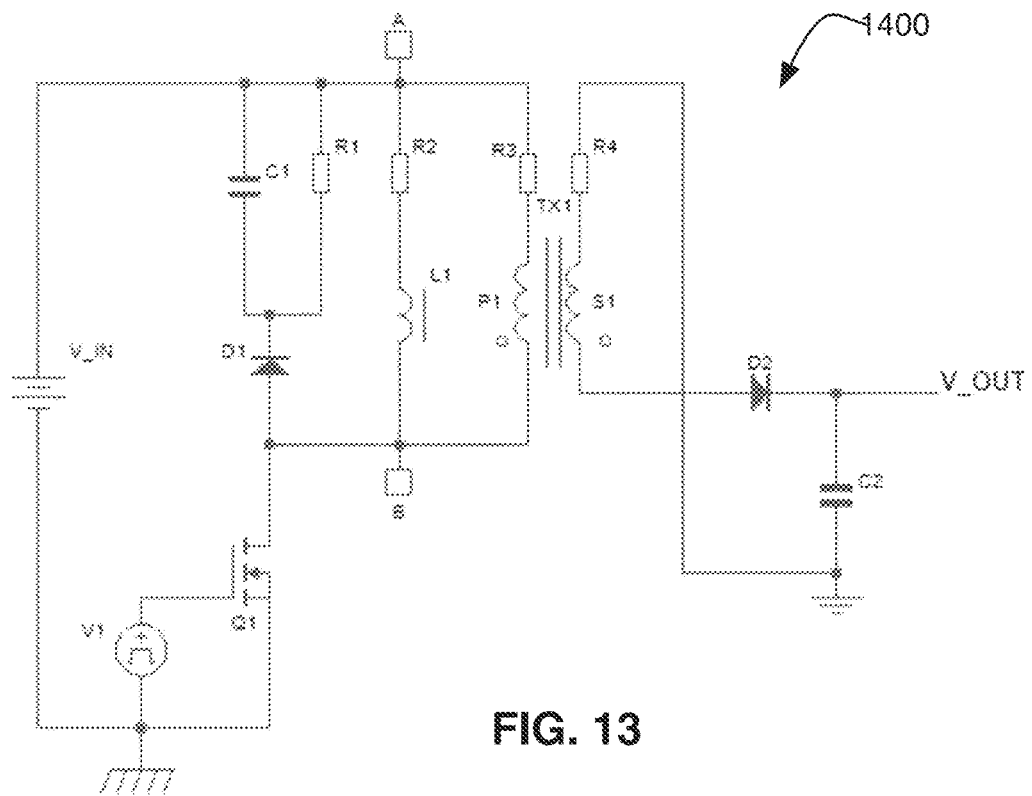
FIG. 13 illustrates a more detailed schematic diagram of a flyback converter with split magnetic elements including parasitic resistances associated with the energy storage inductor and transformer windings.

Turning now from magnetic element construction to circuit configuration, FIG. 13 shows a more detailed schematic diagram of a flyback converter 1400 with split magnetic elements (i.e., separate discrete energy storage inductor L1 together with transformer TX1 having primary winding P1 and secondary winding S1). FIG. 13 also schematically depicts the parasitic resistance R2 associated with the energy storage inductor L1 and parasitic resistances R3 and R4 associated with the transformer primary winding P1 and secondary winding S1, respectively.

When main switch Q1 is turned on, the input voltage V_IN is impressed across nodes A and B. On first inspection, it would appear that both energy storage inductor L1 and transformer primary winding P1 would have impressed upon them the same volt-second product during the on time of main switch Q1. However, this is not strictly true. As described above, the inductance of energy storage inductor L1 can be much lower in value than the inductance of transformer primary winding P1. As a result, a (potentially significantly) higher current can flow through energy storage inductor L1 than flows in transformer primary winding P1. This difference in current can cause differing voltage drops in parasitic resistances R2 and R3. Like the inductance values of energy storage inductor L1 and transformer primary winding P1, the parasitic resistance values R2 and R3 can also be somewhat different because of differences in construction, such as those discussed below. In some, even possibly many, applications, the voltage drop across energy storage inductor parasitic resistance R2 will be higher than the voltage drop across primary winding parasitic resistance R3. This "steals" more voltage from the magnetizing inductance of L1 as compared to transformer primary winding P1, which can cause a slightly higher flux excursion in transformer TX1 than in inductor L1.

Similarly, when main switch Q1 turns off, the flyback period starts. During this flyback period, the energy storage inductor current will pass through primary winding P1 (reversing the current through transformer winding P1). In this case too, the voltage drops across parasitic resistances R2 and R3 are not necessarily equal. This can cause a net higher DC flux in transformer TX1 than in energy storage inductor L1. If the value of this DC flux in transformer TX1 is relatively low, then it may not significantly impact transformer operation. However, if the value of this DC flux is relatively high, it can cause the transformer TX1 to saturate at higher power levels.

Figure 14:
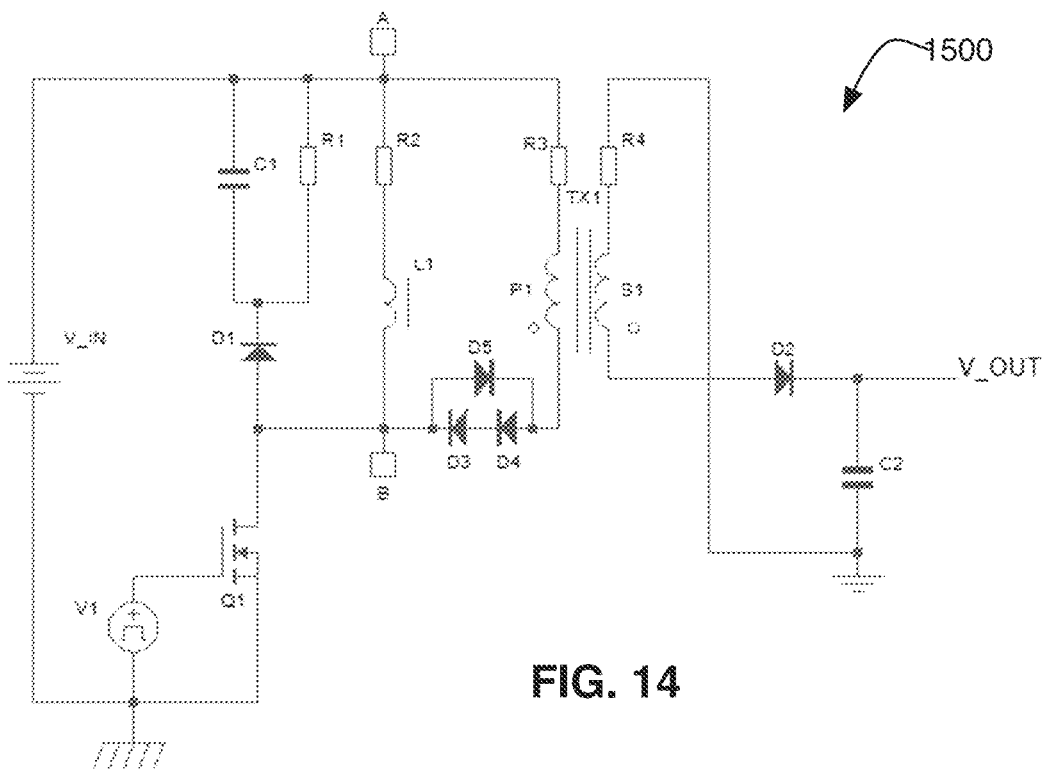
FIG. 14 illustrates a split-magnetic flyback converter that includes a diode circuit between the energy storage inductor L1 and the transformer primary winding P1.

This DC flux in the transformer can be addressed in various ways. A first solution is to introduce a small air gap in the core of transformer TX1, as described above. (See, e.g., FIG. 8, 9-11 and accompanying discussion.). FIG. 14 illustrates an alternative way to address this issue. This alternative solution is schematically depicted in FIG. 14. More specifically, FIG. 14 depicts a split-magnetic flyback converter 1500 that includes a diode circuit made up of diodes D3, D4, and D5 between the energy storage inductor L1 and the transformer primary winding P1. Diodes D3, D4, and D5 are inserted in series with the primary winding P1 of the transformer. Diodes D3 and D4 reduce the voltage impressed on the primary winding when main switch Q1 is on. In other words, the forward voltage drops of diodes D3 and D4 are subtracted from the V_IN voltage impressed across primary winding P1 and its parasitic resistance R3. This can offset the lower voltage drop in parasitic resistance R3 as compared to parasitic resistance R2. In the reverse direction, operable during the flyback period, only a single diode D5 appears in series with P1. This reduces power losses while also achieving the desired purpose of counteracting the extra voltage across primary winding P1, although at the cost of some additional power loss in D5.

Figure 15:
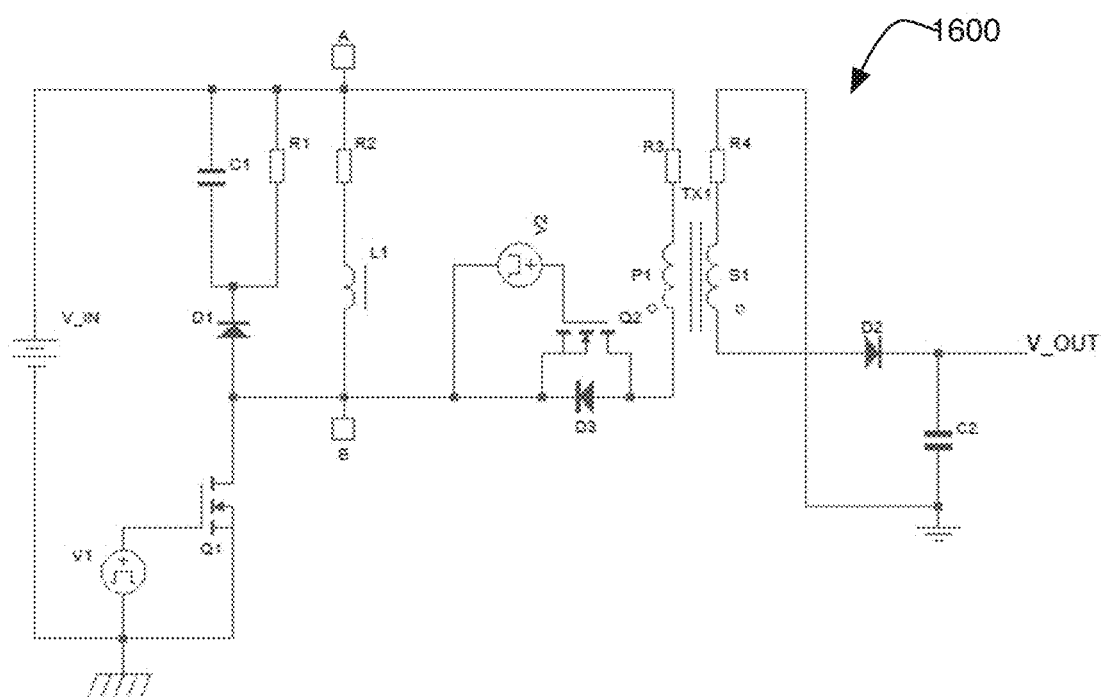
FIG. 15 shows an alternative split-magnetic flyback converter including an alternative switch/diode circuit between the energy storage inductor L1 and the transformer primary winding P1.

FIG. 15 shows an alternative split-magnetic flyback converter 1600 that reduces the power loss associated with reverse diode D5 of converter 1500 during the flyback period. A single diode D3 reduces the magnetizing voltage impressed upon primary winding P1 during the on time of main switch Q1. When Q1 turns off, initiating the flyback period, the energy storage inductor current freewheels through the body diode of the MOSFET switch Q2 and transformer primary winding P1. Switch Q2 can be turned on complementarily to Q1 (i.e., Q2 is on when Q1 is off and Q2 is off when Q1 is on). As a result, the relatively lower on resistance of switch Q2 reduces the power loss during the flyback period. The operation also prevents/reduces any large DC flux shift in transformer TX1 with respect to inductor L1. The complementary signal to drive Q1 can be simply derived through an auxiliary flyback winding on either inductor L1 or transformer TX1, making control of the circuit simple.

As still another alternative solution, diode D3 in FIG. 15 can be replaced by a resistor. The resistance value of this resistor may be selected based on the net difference in the flux as between inductor L1 and transformer primary P1 in the relevant application. This difference in flux can be determined based on design calculations, simulation, or by testing characterization of an actual physical implementation.

The foregoing describes exemplary embodiments of flyback converters having split magnetic elements. Such converters may be used in a variety of applications but may be particularly advantageous when used in conjunction with battery powered personal electronic devices such as smartphones, smart watches, tablet computers, laptop computers, and associated accessories. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A flyback converter comprising:
input terminals configured to receive an input voltage;
a transformer having a primary winding selectively energized by the input voltage and a secondary winding that delivers an output voltage via a rectifier;
a discrete energy storage inductor separate from the primary and secondary windings and coupled in parallel with one of the primary winding or the secondary winding; and
a main switching device that switches to:
selectively energize the primary winding; and
alternately store energy in the energy storage inductor and allow energy stored in the energy storage inductor to be delivered to the transformer;
wherein:
the transformer is constructed on a first magnetic core, and the discrete energy storage inductor is constructed on a second magnetic core;
the first and second magnetic cores have at least one common element; and
magnetic flux from the discrete energy storage inductor and magnetic flux from the transformer at least partially cancel in the at least one common element.

2. The flyback converter of claim 1 wherein the discrete energy storage inductor is coupled in parallel with the primary winding.

3. The flyback converter of claim 1 wherein:
turning on the main switching device causes a current through the discrete energy storage inductor in a first direction and a current through the primary winding in a corresponding direction; and
turning off the main switching devices causes the current to continue flowing through the discrete energy storage inductor in the first direction while reversing the current through the primary winding.

4. The flyback converter of claim 1 further comprising circuitry coupled between the transformer and the discrete energy storage inductor that offsets effects of unequal parasitic impedances as between the discrete energy storage inductor and the transformer.

5. The flyback converter of claim 4 wherein the discrete energy storage inductor is coupled in parallel with the primary winding and the circuitry comprises:
first and second diodes coupled in series with each other and the primary winding and oriented to permit current flow through the primary winding in a first direction; and
a third diode coupled in anti-parallel with the series combination of the first and second diodes so as to permit current flow through the primary winding in a second direction opposite the first direction.

6. The flyback converter of claim 4 wherein the discrete energy storage inductor is coupled in parallel with the primary winding and the circuitry comprises:
a first diode coupled in series with the primary winding and oriented to permit current flow through the primary winding in a first direction; and
a switching device coupled across the first diode and operated to permit current flow through the primary winding in a second direction opposite the first direction with minimal voltage drop.

7. A flyback converter comprising:
a primary winding selectively energized by an input voltage;
a secondary winding magnetically coupled to the primary winding that delivers an output voltage via a rectifier;
a discrete energy storage inductor separate from the primary and secondary windings and coupled in parallel with one of the primary winding and the secondary winding; and
a main switching device that:
switches on to cause a current through the discrete energy storage inductor in a first direction and a current through the primary winding in a corresponding direction, thereby selectively energizing the primary winding and storing energy in the energy storage inductor; and
switches off to cause the current to continue flowing through the discrete energy storage inductor in the first direction while reversing the current through the primary winding, thereby allowing energy stored in the energy storage inductor to be delivered to the primary winding;
wherein:
the primary and secondary windings are constructed on a first magnetic core, and the discrete energy storage inductor is constructed on a second magnetic core;
the first and second magnetic cores have at least one common element; and
magnetic flux from the discrete energy storage inductor and magnetic flux from the primary and secondary windings at least partially cancel in the at least one common element.

8. The flyback converter of claim 7 wherein the discrete energy storage inductor is coupled in parallel with the primary winding.

9. The flyback converter of claim 7 further comprising circuitry coupled between the primary or secondary winding and the discrete energy storage inductor that offsets effects of unequal parasitic impedances as between the discrete energy storage inductor and the transformer.

10. The flyback converter of claim 9 wherein the discrete energy storage inductor is coupled in parallel with the primary winding and the circuitry comprises:
first and second diodes coupled in series with each other and the primary winding and oriented to permit current flow through the primary winding in a first direction; and
a third diode coupled in anti-parallel with the series combination of the first and second diodes so as to permit current flow through the primary winding in a second direction opposite the first direction.

11. The flyback converter of claim 9 wherein the discrete energy storage inductor is coupled in parallel with the primary winding and the circuitry comprises:
- a first diode coupled in series with the primary winding and oriented to permit current flow through the primary winding in a first direction; and
- a switching device coupled across the first diode and operated to permit current flow through the primary winding in a second direction opposite the first direction with minimal voltage drop.

12. A power converter comprising:
- a primary winding selectively energized by an input voltage;
- a secondary winding magnetically coupled to the primary winding that delivers an output voltage to a load via a rectifier;
- a discrete energy storage inductor magnetically decoupled from the primary and secondary windings and electrically coupled in parallel with one of the primary winding or the secondary winding; and
- at least one switching device that switches between a first state that stores energy in the discrete energy storage inductor and a second state that causes energy stored in the discrete energy storage inductor to be delivered to the load;
- wherein:
  - the primary and secondary windings form a transformer constructed on a first magnetic core, and the discrete energy storage inductor is constructed on a second magnetic core;
  - the first and second magnetic cores have at least one common element; and
  - magnetic flux from the discrete energy storage inductor and magnetic flux from the transformer at least partially cancel in the at least one common element.

13. The power converter of claim 12 wherein the discrete energy storage inductor is coupled in parallel with the primary winding.

14. The power converter of claim 12 further comprising circuitry coupled between the transformer and the discrete energy storage inductor that offsets effects of unequal parasitic impedances as between the discrete energy storage inductor and the transformer.

15. The power converter of claim 14 wherein the discrete energy storage inductor is coupled in parallel with the primary winding and the circuitry comprises:
- first and second diodes coupled in series with each other and the primary winding and oriented to permit current flow through the primary winding in a first direction; and
- a third diode coupled in anti-parallel with the series combination of the first and second diodes so as to permit current flow through the primary winding in a second direction opposite the first direction.

16. The power converter of claim 14 wherein the discrete energy storage inductor is coupled in parallel with the primary winding and the circuitry comprises:
- a first diode coupled in series with the primary winding and oriented to permit current flow through the primary winding in a first direction; and
- a switching device coupled across the first diode and operated to permit current flow through the primary winding in a second direction opposite the first direction with minimal voltage drop.

17. A flyback converter comprising:
- input terminals configured to receive an input voltage;
- a transformer having a primary winding selectively energized by the input voltage and a secondary winding that delivers an output voltage via a rectifier;
- a discrete energy storage inductor separate from the primary and secondary windings and coupled in parallel with one of the primary winding or the secondary winding;
- a main switching device that switches to:
  - selectively energize the primary winding; and
  - alternately store energy in the energy storage inductor and allow energy stored in the energy storage inductor to be delivered to the transformer; and
- circuitry coupled between the transformer and the discrete energy storage inductor that offsets effects of unequal parasitic impedances as between the discrete energy storage inductor and the transformer.

18. The flyback converter of claim 17 wherein the discrete energy storage inductor is coupled in parallel with the primary winding.

19. The flyback converter of claim 17 wherein:
- turning on the main switching device causes a current through the discrete energy storage inductor in a first direction and a current through the primary winding in a corresponding direction; and
- turning off the main switching devices causes the current to continue flowing through the discrete energy storage inductor in the first direction while reversing the current through the primary winding.

20. The flyback converter of claim 17 wherein the discrete energy storage inductor is coupled in parallel with the primary winding and the circuitry comprises:
- first and second diodes coupled in series with each other and the primary winding and oriented to permit current flow through the primary winding in a first direction; and
- a third diode coupled in anti-parallel with the series combination of the first and second diodes so as to permit current flow through the primary winding in a second direction opposite the first direction.

21. The flyback converter of claim 17 wherein the discrete energy storage inductor is coupled in parallel with the primary winding and the circuitry comprises:
- a first diode coupled in series with the primary winding and oriented to permit current flow through the primary winding in a first direction; and
- a switching device coupled across the first diode and operated to permit current flow through the primary winding in a second direction opposite the first direction with minimal voltage drop.

22. A flyback converter comprising:
- a primary winding selectively energized by an input voltage;
- a secondary winding magnetically coupled to the primary winding that delivers an output voltage via a rectifier;
- a discrete energy storage inductor separate from the primary and secondary windings and coupled in parallel with one of the primary winding and the secondary winding; and
- a main switching device that:
  - switches on to cause a current through the discrete energy storage inductor in a first direction and a current through the primary winding in a corresponding direction, thereby selectively energizing the primary winding and storing energy in the energy storage inductor; and
  - switches off to cause the current to continue flowing through the discrete energy storage inductor in the first direction while reversing the current through the primary winding, thereby allowing energy stored in the energy storage inductor to be delivered to the primary winding; and circuitry coupled between the primary or secondary winding and the discrete energy storage inductor that offsets effects of unequal parasitic impedances as between the discrete energy storage inductor and the transformer;

wherein the primary and secondary windings are constructed on a first magnetic core, and the discrete energy storage inductor is constructed on a second magnetic core.

23. The flyback converter of claim 22 wherein the discrete energy storage inductor is coupled in parallel with the primary winding.

24. The flyback converter of claim 22 wherein the discrete energy storage inductor is coupled in parallel with the primary winding and the circuitry comprises:

first and second diodes coupled in series with each other and the primary winding and oriented to permit current flow through the primary winding in a first direction; and a third diode coupled in anti-parallel with the series combination of the first and second diodes so as to permit current flow through the primary winding in a second direction opposite the first direction.

25. The flyback converter of claim 22 wherein the discrete energy storage inductor is coupled in parallel with the primary winding and the circuitry comprises:

a first diode coupled in series with the primary winding and oriented to permit current flow through the primary winding in a first direction; and a switching device coupled across the first diode and operated to permit current flow through the primary winding in a second direction opposite the first direction with minimal voltage drop.

26. A power converter comprising:

a primary winding selectively energized by an input voltage;

a secondary winding magnetically coupled to the primary winding that delivers an output voltage to a load via a rectifier;

a discrete energy storage inductor magnetically decoupled from the primary and secondary windings and electrically coupled in parallel with one of the primary winding or the secondary winding;

at least one switching device that switches between a first state that stores energy in the discrete energy storage inductor and a second state that causes energy stored in the discrete energy storage inductor to be delivered to the load; and circuitry coupled between a transformer formed from the primary and secondary windings and the discrete energy storage inductor that offsets effects of unequal parasitic impedances as between the discrete energy storage inductor and the transformer.

27. The power converter of claim 26 wherein the discrete energy storage inductor is coupled in parallel with the primary winding.

28. The power converter of claim 26 wherein the discrete energy storage inductor is coupled in parallel with the primary winding and the circuitry comprises:

first and second diodes coupled in series with each other and the primary winding and oriented to permit current flow through the primary winding in a first direction; and a third diode coupled in anti-parallel with the series combination of the first and second diodes so as to permit current flow through the primary winding in a second direction opposite the first direction.

29. The power converter of claim 26 wherein the discrete energy storage inductor is coupled in parallel with the primary winding and the circuitry comprises:

a first diode coupled in series with the primary winding and oriented to permit current flow through the primary winding in a first direction; and a switching device coupled across the first diode and operated to permit current flow through the primary winding in a second direction opposite the first direction with minimal voltage drop.

* * * * *